United States Patent Office 2,760,957
Patented Aug. 28, 1956

2,760,957

PHOSPHORUS AND/OR SULFUR-CONTAINING REACTION PRODUCTS OF CARBONYL COMPOUNDS AND POLYAMINES

David E. Adelson, Berkeley, Calif., assignor to Shell Development Company, San Francisco, Calif., a corporation of Delaware No Drawing. Application June 1, 1953,
Serial No. 358,951

12 Claims. (Cl. 260—132)

This invention relates to novel reaction products obtained by treating the reaction product of a carbonyl compound and a polyamine with a sulfurizing, phosphorizing, or sulfo-phosphorizing agent.

It is a principal object of this invention to provide a novel class of compounds particularly suitable as multifunctional improving and enhancing additives for lubricants. Other subjects will appear from the following description of the present invention.

Broadly stated, the invention is directed to products obtained by first reacting an organic carbonyl compound with a polyamine, and treating said reaction product with a sulfurizing (or compound of the sulfur family), phosphorizing or sulfo-phosphorizing agent, such as elemental sulfur, sulfur halides, alkali polysulfides, phosphorus, phosphorus halides and phosphorus oxyhalides, phosphorus sulfides, phosphorus acids, reactive organic phosphorus compounds and the like.

The organic carbonyl compound may be a saturated or unsaturated ketone or aldehyde; the following are representative examples:

I. Aliphatic ketones, such as: acetone, methyl ethyl ketone, methyl isobutyl ketone, methyl n-amyl ketone, dipropyl ketone, ethyl amyl ketone, diisobutyl ketone, diethyl ketone, mesityl oxide and condensation products thereof, 3-methyl-heptanone, methyl vinyl ketone, pentanedione, palmitone, laurone, stearone, pentadecanone, etc.

II. Aromatic ketones, such as: acetophenone, benzophenone, benzyl phenyl ketone, dibenzyl ketone, etc.

III. Cyclic ketones, such as: isophorone and higher homologues thereof, isophorone bottoms and fraction thereof, cyclobutanone, cyclopentanone, cyclohexanone, methyl cyclohexanone, menthone, camphor, beta decalone, pulegone, piperitone, eucarvone, carvenone, etc.

IV. Other types of ketones, such as: diacetyl, acetylacetone, acetonylacetone, cyclohexandione, quinone, benzoylacetone, etc.

V. Aliphatic aldehydes, such as: acetaldehyde, propionaldehyde, butyraldehyde, caproaldehyde, acrolein, croton aldehyde, ethyl butyraldehyde, ethyl propylaldehyde, heptaldehyde, 2-ethyl hexanal, chloral, butyl chloral, etc.

VI. Aromatic aldehydes, such as:: benzaldehyde, paratoluic aldehyde, cinnamaldehyde, salicicylaldehyde, naphthaldehyde, vanillin, phenylacetaldehyde, laurylbenzaldehyde, etc.

Among the preferred compounds are the higher molecular weight organic carbonyl campounds, particularly the higher molecular weight ketones. Of these ketones, preferred are the cyclic ketones, such as isophorone bottoms.

Isophorone bottoms are primarily high molecular weight unsaturated ketones having at least twelve and preferably more than eighteen carbon atoms in the molecule. These products may be obtained by condensation of acetone in a caustic solution under elevated temperature and pressure. Specifically, the product is obtainable by condensing acetone in a 30% to 60% caustic solution at a temperature ranging between about 130° C. and about 170° C., and under a pressure of from about 300 to about 500 pounds per square inch. The resultant product is subjected to distillation to remove distillable ketones and other constituents and impurities. The product remaining in the still is preferably purified by filtration, solvent treatment, and comprises crude unsaturated cyclic ketones of high molecular weight, preferably referred to as "crude isophorone bottoms." The term "isophorone bottoms," as referred to herein, is usually a complex mixture of high molecular weight unsatured cylic ketones containing at least twelve and preferably more than eighteen carbon atoms in the molecule. These crude isophorone bottoms can be used as such or fractionated and/or chemically treated as disclosed in U. S. Patent 2,489,249.

The polyamines which can be used to react with the above organic carbonyl compounds in order to form the initial reaction product of this invention are alkylene polyamines, such as: ethylene diamine, diethylene triamine, triethylene tetramine, tetraethylene pentamine, tetramethyl methylene diamine, propylene diamine, dipropylene triamine, tripropylene tetramine, N-n-dodecyl diethylene triamine, N-octyl ethylene diamine, hydroxyethyl-ethylene diamine, hydroxy isopropyl propylene diamine, hydroxy ethyl diethylene triamine, N-beta-hydroxypropyl propylene diamine, N-n-hexadecyl diethylene triamine, 3-diethyl amino propylamine, 1,3 diamino butane, 1,10 decylene diamine, phenyl ethylene diamine, di-o-tolyl ethylene diamine and the like.

The initial reaction product of this invention, namely, a reaction product obtained by reacting organic carbonyl compounds with polyamines disclosed above is carried out by admixing the reacting materials in a suitable reaction vessel with or without an inert solvent such as benzene, toluene, light hydrocarbons and the like, preferably in the mole ratio of 2 to 6 moles of the carbonyl compound to 1 to 3 moles of the polyamine. The reaction can be carried out at reflux temperature, and generally varies from 50° C. to 250° C., and preferably 80° C. to 180° C., and is continued for a period of time until water formation ceases. The water formed is generally removed as it is formed by distillation and any polyamine which is carried over with the water is replaced and the reaction continued until completed. Generally, the time required to complete the initial reaction varies from 4 to 24 hours. The initial reaction product can be freed of unreacted materials, impurities and solvent such as benzene, if used, by heating the reaction product at around 100° C. in a stream of natural gas.

The final reaction product is obtained by treating an initial reaction product (as described in the preceding paragraph) with a sulfurizing, phosphorizing and/or sulfo-phosphorizing agent preferably in the mole ratio of from 1:1 to 1:8, respectively, and the preferred mole ratio of the reactants is from 1:2 to 1:4.

Among the sulfurizing, phosphorizing and/or sulfophosphorizing agents which can be used to treat the initial reaction product may be included sulfur, $H_2S$, $SCl_2$, $S_2Cl_2$, sodium tetrasulfide, sodium pentasulfide; $POCl_3$, $PCl_3$, $PCl_5$, $P_2S_5$, $P_4S_3$, selenium $P_2Se_5$ and the like.

The final reaction is carried out under varying temperature conditions which can range from below zero to above 200° C. and higher. The temperature primarily depends on the phosphorizing, sulfurizing and/or sulfophosphorizing agents used to form the final product of this invention. For example, if phosphorus chloride is used the final reaction should be carried out at between −10° C. and zero degrees centigrade, while when sulfur halides are used the temperature ranges from zero to about 100° C. On the other hand, when sulfur or sodium polysulfide is used to form the final reaction product, the temperature reaction conditions generally vary between 115° C. and 200° C. and preferably between 125° C. and 170° C.; while if phosphorus sulfides are used the reaction temperature is generally in the range of from 100° C. to 180° C. In essence the sulfur, phosphorus and/or sulfo-phosphorus materials used to treat the initial reaction product govern the final reaction temperature. Reaction products of this invention can be added to various bases in amounts of from 0.01 to 10% and preferably from about 0.1 to 5%.

To more clearly illustrate the present invention, the following examples are presented.

EXAMPLE I

A. *Initial reaction product of topped, crude isophorone bottoms with ethylene diamine*

About two moles of topped, crude isophorone bottoms fraction containing at least eighteen carbon atoms in the molecule and about one mole of ethylene diamine were dispersed in benzene, and the entire mixture was heated at 75°–80° C. under a short distillation column bearing a phase separating stillhead. Water was drawn off overhead as lower layer in the benzene-water azeotrope. When water formation ceased, the water layer was titrated with standard acid in order to determine the amount of ethylene diamine that had distilled over. This quantity of the diamine was then added to the reaction vessel, and heating and stirring was resumed until water evolution again ceased. The reaction product was freed from benzene, and small amounts of unchanged ethylene diamine by heating at about 100° C. in a stream of natural gas. The product obtained was a dark brown transparent mass, which was non-flowing at room temperature and on analysis contained 3.0(8)% nitrogen.

B. *Final reaction product obtained by treating I(A) with phosphorus pentasulfide*

To approximately one mole of the above initial reaction product (IA) about two moles of phosphorus pentasulfide were slowly added, and the mixture was reacted under constant agitation for about three hours at a temperature of from about 125° to 130° C. The product was extracted with a mixture of equal volumes of methyl ethyl ketone and a non-aromatic hydrocarbon having a boiling range of between 164° F. and 233° F. The product was filtered, and the filtrate evaporated. The resultant product was a brittle, dark brown solid, which on analysis contained:

Sulfur, percent wt. _____ 9.8
Phosphorus, percent wt. _____ 7.8
Nitrogen, percent wt. _____ 1.6(7)

The product was oil suluble and imparted extreme pressure properties to base oil.

EXAMPLE II

A. *Initial reaction product of diisobutyl ketone bottoms with ethylene diamine*

About two moles of diisobutyl ketone bottoms containing at least eighteen carbon atoms in the molecule and about one mole of ethylene diamine were dispersed in benzene, and the mixture reacted and processed under the same conditions as in Example I(A). The product obtained was a dark brown viscous liquid, which on analysis contains 4.4(4)% nitrogen.

B. *Final reaction product obtained by treating IIA with phosphorus pentasulfide*

About one mole of the above initial reaction product (IIA) and about four moles of $P_2S_5$ were admixed, and the mixture was reacted under constant agitation at a temperature of from about 110° C. to 150° C. The nitrogen, phosphorus and sulfur-containing reaction product was worked up as in Example IB and was a viscous, brown mass, which analyzed as follows:

Sulfur, percent wt. _____ 9.7
Phosphorus, percent wt. _____ 7.6(5)
Nitrogen, percent wt. _____ 1.7

EXAMPLE III

A. *Initial reaction product of a saturated cyclic ketone fraction containing eighteen carbon atoms and obtained from mesityl oxide condensation with ethylene diamine*

About two moles of a $C_{18}$ saturated cyclic ketone (derived from mesityl oxide condensation) and about one mole of ethylene diamine were reacted under substantially the same conditions as disclosed in example IA. The product obtained was a dark brown transparent mass, virtually non-flowing at room temperature and on analysis contained 3.3(3)% nitrogen.

B. *Final reaction product obtained by treating IIIA with sulfur monochloride*

To approximately two moles of the above reaction product, about one mole of sulfur monochloride was added dropwise at ice temperature, and the mixture was stirred vigorously and warmed slowly to room temperature over a period of about twenty-four hours. The reaction product was then heated for about three hours on a steam bath and thereafter separately solvent treated, first with a non-aromatic hydrocarbon and then with methyl ethyl ketone as in Example I. The non-aromatic hydrocarbon portion was a dark brown viscous mass, and on analysis contained:

Carbon, percent wt. _____ 68.8(9)
Hydrogen, percent wt. _____ 9.9(7)
Nitrogen, percent wt. _____ 2.1(9)
Chlorine, percent wt. _____ 5.2(2)
Sulfur, percent wt. _____ 9.8(5)
Oxygen, percent wt. (by difference) _____ 3.8(8)

while the methyl ethyl ketone portion on analysis contained:

Carbon, percent wt. _____ 60.4(7)
Hydrogen, percent wt. _____ 8.5(0)
Nitrogen, percent wt. _____ 3.4(1)
Chlorine, percent wt. _____ 7.7(9)
Sulfur, percent wt. _____ 13.5
Oxygen, percent wt. (by difference) _____ 6.3(3)

Both the hydrocarbon and ketone-soluble fractions were oil soluble and imparted good extreme pressure properties to base mineral oil.

EXAMPLE IV

About one mole of the initial reaction product of Example II and about four moles of sulfur monochloride were reacted under the conditions described in Example IIIB and the reaction product formed was solvent treated with the non-aromatic hydrocarbon as described above. The soluble portion of the reaction product was a dark brown, extremely viscous mass, which on analysis contained:

Nitrogen, percent wt. _____ 7.2(6)
Chlorine, percent wt. _____ 4.4(1)
Sulfur, percent wt. _____ 23.9 while the insoluble portion of the reaction product was a black, brittle solid, which on analysis contained:

Nitrogen, percent wt. _____ 2.1(3)
Chlorine, percent wt. _____ 4.6(2)
Sulfur, percent wt. _____ 36.7

EXAMPLE V

About one mole of the initial reaction product of Example IA was admixed with two moles of flower of sulfur, and the mixture was heated for about three hours with vigorous agitation at 125°–170° C. The reaction product was solvent treated with a light hydrocarbon, filtered and on removing the solvent a dark brown viscous material, which was non-flowing at room temperature, was obtained, which on analysis contained:

Nitrogen, percent weight _____ 2.0(6)
Sulfur, percent weight _____ 7.3(2)

EXAMPLE VI

About one mole of the initial reaction product of Example IIIA and four moles of flower of sulfur were admixed and reacted under the same conditions as described in Example V. The solvent-treated product was a dark brown, semi-solid mass, which on analysis contained:

Nitrogen, percent weight _____ 2.3(0)
Sulfur, percent weight _____ 4.4(8)

EXAMPLE VII

A. *Initial reaction product of topped, crude isophorone bottoms with propylene diamine*

About two moles of topped, crude isophorone bottoms fraction containing at least eighteen carbon atoms in the molecule and about one mole of propylene diamine were dispersed in benzene and reacted under the condition of Example IA. The product obtained was a dark brown transparent mass, which was non-flowing at room temperature and on analysis contained over 3% nitrogen.

B. *Final reaction product obtained by treating VIIA with phosphorus pentasulfide*

To approximately one mole of the above initial reaction product VIIA about two moles of phosphorus pentasulfide was slowly added, and the mixture was reacted under constant agitation for about three hours at a temperature of from about 125° to 130° C. The product was extracted with a mixture of equal volumes of methyl ethyl ketone and a non-aromatic hydrocarbon having a boiling range of between 164° F. and 233° F. The product was filtered and the filtrate evaporated. The resultant product on analysis contained sulfur, phosphorus and nitrogen in the molecule and was oil soluble.

EXAMPLE VIII

A. *Initial reaction product of diisobutyl ketone bottoms with di-o-tolyl ethylene diamine*

About two moles of diisobutyl ketone bottoms containing at least eighteen carbon atoms in the molecule and about one mole of di-o-tolyl ethylene diamine were dispersed in benzene, and the mixture reacted and processed under the same condition as in Example IA. The product obtained was a dark brown, viscous liquid, which on analysis contained over 4% nitrogen.

B. *Final reaction product obtained by treating VIIIA with phosphorus pentasulfide*

About one mole of the above initial reaction product VIIIA and about four moles of $P_2S_5$ were admixed and the mixture was reacted under constant agitation at a temperature of from about 110° to 150° C. The nitrogen phosphorus and sulfur-containing reaction product was worked up as in Example IB and was a viscous, brown mass, which on analysis contained sulfur, phosphorus and nitrogen in the molecule.

EXAMPLE IX

A. *Initial reaction product of benzophenone with ethylene diamine*

About two moles of benzophenone and about one mole of ethylene diamine were dispersed in benzene, and the entire mixture reacted and processed under the same condition as in Example IA. The product obtained was a dark brown transparent mass, which was non-flowing at room temperature and on analysis contained over 3% nitrogen.

B. *Final reaction product obtained by treating IXA with phosphorus pentasulfide*

To approximately one mole of the above initial reaction product IXA about two moles of phosphorus pentasulfide were slowly added, and the mixture was reacted under constant agitation for about three hours at a temperature of from about 125° to 150° C. The product was extracted with a mixture of equal volumes of methyl ethyl ketone and a non-aromatic hydrocarbon having a boiling range of between 164° F. and 233° F. The product was filtered, and the filtrate evaporated. The resultant product contained sulfur, phosphorus and nitrogen in the molecule and was oil soluble and possessed extreme pressure properties.

EXAMPLE X

A. *Reaction product of butyraldehyde with ethylene diamine*

About two moles of butyraldehyde and about one mole of ethylene diamine were dispersed in benzene, and the entire mixture reacted under the conditions of Example IA. The product obtained was a dark brown, transparent mass, which was non-flowing at room temperature and on analysis contained 3% nitrogen.

B. *Final reaction product obtained by treating XA with phosphorus pentasulfide*

To approximately one mole of the above initial reaction product XA about two moles of phosphorus pentasulfide were slowly added, and the mixture was reacted under constant agitation for about three hours at a temperature of from about 125° to 130° C. The product was extracted with a mixture of equal volumes of methyl ethyl ketone and a non-aromatic hydrocarbon having a boiling range of between 164° F. and 233° F. The product was filtered and the filtrate evaporated.

The product was oil soluble and possessed extreme pressure properties.

EXAMPLE XI

A. *Reaction product of lauryl benzaldehyde with ethylene diamine*

About two moles of lauryl benzaldehyde and about one mole of ethylene diamine were dispersed in benzene, and the entire mixture was heated under conditions of Example IA. Water was drawn off overhead as lower layer in the benzene-water azeotrope. When water formation ceased, the water layer was titrated with standard acid in order to determine the amount of ethylene diamine that had distilled over. This quantity of the diamine was then added to the reaction vessel, and heating and stirring was resumed until water evolution again ceased. The reaction product was freed from benzene, and small amounts of unchanged ethylene diamine by heating at about 100° C. in a stream of natural gas. The product obtained was non-flowing at room temperature and on analysis contained over 3% nitrogen.

B. *Final reaction product obtained by treating XIA with phosphorus pentasulfide*

To approximately one mole of the above initial reaction product XI(A) about two moles of phosphorus pentasulfide were slowly added, and the mixture was reacted under constant agitation for about three hours at a temperature of from about 125° to 150° C. The product was extracted with a mixture of equal volumes of methyl ethyl ketone and a non-aromatic hydrocarbon having a boiling range of between 164° F. and 233° F. The product was filtered and the filtrate evaporated.

The product was oil soluble and possessed extreme pressure properties.

EXAMPLE XII

A. *Reaction product of phenylacetaldehyde with ethylene diamine*

About two moles of phenylacetaldehyde and about one mole of ethylene diamine were dispersed in benzene, and the entire mixture was reacted as in the above initial reactions. The product obtained on analysis contained over 3% nitrogen.

B. *Final reaction product obtained by treating XIIA with phosphorus pentasulfide*

To approximately one mole of the above initial reaction product XII(A) about two moles of phosphorus pentasulfide were slowly added, and the mixture was reacted under constant agitation for about three hours at a temperature of from about 125° to 150° C. The product was extracted with a mixture of equal volumes of methyl ethyl ketone and a non-aromatic hydro-carbon having a boiling range of between 164° F. and 233° F. The product was filtered and filtrate evaporated and found to be oil soluble and possessed extreme pressure properties.

EXAMPLE XIII

A. *Reaction product of benzophenone with propylene diamine*

About two moles of benzophenone and about one mole of propylene diamine were dispersed in benzene, and the entire mixture was reacted as in the above initial reaction. The product obtained on analysis contained over 3% nitrogen.

B. *Final reaction product obtained by treating XIIIA with phosphorus pentasulfide*

To approximately one mole of the above initial reaction product XIII(A) about two moles of phosphorus pentasulfide were slowly added, and the mixture was reacted under constant agitation for about three hours at a temperature of from about 125° to 150° C. The product was extracted with a mixture of equal volumes of methyl ethyl ketone and a non-aromatic hydro-carbon having a boiling range of between 164° F. and 233° F. The product was filtered, and the filtrate evaporated, and found to be oil soluble and possessed extreme pressure properties to said oil.

EXAMPLE XIV

A. *Reaction product of lauryl benzaldehyde with diethylene triamine*

About two moles of lauryl benzaldehyde fraction containing at least eighteen carbon atoms in the molecule and about one mole of diethylene triamine were dispersed in benzene, and the entire mixture was heated at 75–80° C. under a short distillation column bearing a phase-separating still-head. Water was drawn off overhead as lower layer in the benzene-water azeotrope. When water formation ceased, the water layer was titrated with standard acid in order to determine the amount of diethylene triamine that had distilled over. This quantity of the triamine was then added to the reaction vessel, and heating and stirring was resumed until water evolution again ceased. The reaction product was freed from benzene, and small amounts of unchanged diethylene triamine by heating at about 100° C. in a stream of natural gas. The product obtained was a dark brown, transparent mass, which was non-flowing at room temperature and on analysis contained over 3% nitrogen.

B. *Final reaction product obtained by treating XIVA with phosphorus pentasulfide*

To approximately one mole of the above initial reaction product XIV (A) about two moles of phosphorus pentasulfide were slowly added, and the mixture was reacted under constant agitation for about three hours at a temperature of from about 125° to 130° C. The product was extracted with a mixture of equal volumes of methyl ethyl ketone and a non-aromatic hydro-carbon having a boiling range of between 164° F. and 233° F. The product was filtered and filtrate evaporated, and found to be oil soluble and possess extreme pressure properties to said oil.

EXAMPLE XV

A. *Initial reaction product of benzophenone with ethylene diamine*

About two moles of a benzophenone and about one mole of ethylene diamine were reacted under substantially the same conditions as disclosed in Example IA. The product obtained was a dark brown, transparent mass, virtually non-flowing at room temperature and on analysis contained 3.3(3)% nitrogen.

B. *Final reaction product obtained by treating XVA with sulfur monochloride*

To approximately two moles of the above reaction product about one mole of sulfur monochloride was added dropwise at ice temperature, and the mixture was stirred vigorously and warmed slowly to room temperature over a period of about twenty-four hours. The reaction product was then heated for about three hours on a steam bath and thereafter separately solvent-treated, first with a non-aromatic hydrocarbon and then with methyl ethyl ketone as in Example I.

The final product contained nitrogen and sulfur in the molecule and was oil soluble.

In addition to being excellent anti-corrosion and anti-oxidation agents for mineral lubricating oils, the reaction products of this invention, when added to mineral lubricating oils, inhibit lacquer formation in engines operating under the most adverse conditions. Also, the reaction products of this invention can be used as valuable constituents of heavy duty oils, motor oils, diesel oils, aviation oils, turbine oil, synthetic oils, dioctyl sebacate, alkylated naphthalene and the like, because of their anti-corrosion, anti-oxidation, and anti-wear properties. Besides their utility as lubricating oil additives, reaction products of this invention are useful as anti-oxidants for fuels, natural and synthetic rubber, wax coating compositions and other organic materials which are subject to oxidation deterioration.

The present application is a division of my copending application, Serial No. 177,957, filed August 5, 1950 now Patent Number 2,652,367.

I claim as my invention:

1. A reaction product obtained by first reacting an organic carbonyl compound selected from the group consisting of unsubstituted ketones and unsubstituted aldehydes with an alkylene polyamine in the mole ratio of 2 to 6:1 to 3, respectively, at a temperature of from 50° to 250° C. until water formation ceases and treating the resulting product with an inorganic carbon-free sulfur compound selected from the group consisting of phosphorus sulfide, sulfur halide and sulfur in the mole ratio of from 1:1 to 1:8, respectively, at a temperature ranging from below zero degree to about 175° C. and for a period of from 3 to 24 hours.

2. A reaction product obtained by first reacting an unsubstituted ketone with an alkylene polyamine in the mole ratio of 2 to 6:1 to 3, respectively, at a temperature of from 50° to 250° C. until water formation ceases and treating the resulting product with an inorganic carbon-free sulfur compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

3. A reaction product obtained by first reacting an unsubstituted aldehyde with an alkylene polyamine in the mole ratio of 2 to 6:1 to 3, respectively, at a temperature of from 50° to 250° C. until water formation ceases and treating the resulting product with an inorganic carbon-free sulfur compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

4. A reaction product obtained by first reacting an unsubstituted cyclic ketone with an alkylene polyamine in the mole ratio of 2 to 6:1 to 3, respectively, at a temperature of from 50° to 250° C. until water formation ceases and treating the resulting product with an inorganic carbon-free sulfur compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

5. A reaction product obtained by first reacting an isophorone bottoms fraction having at least twelve carbon atoms with an ethylene diamine in the mole ratio of 2 to 6:1 to 3, respectively, at a temperature of from 50° to 250° C. until water formation ceases and treating the resulting product with an inorganic carbon-free sulfur compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

6. A reaction product obtained by first reacting diisobutyl ketone with an ethylene diamine in the mole ratio of 2 to 6:1 to 3, respectively, at a temperature of from 50° to 250° C. until water formation ceases and treating the resulting product with an inorganic carbon-free sulfur compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

7. A reaction product obtained by reacting an isophorone bottoms fraction having at least twelve carbon atoms per molecule with ethylene diamine in the mole ratio of 2 to 6:1 to 3, respectively, at a temperature of from 80 to 180° C. until water formation ceases and treating the resulting reaction product with an inorganic compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

8. A reaction product obtained by reacting diisobutyl ketone with ethylene diamine in the mole ratio of 2 to 6:1 to 3, respectively, at a temperature of from 80 to 180° C. until water formation ceases and treating the resulting reaction product with an inorganic compound selected from the group consisting of phosphorus sulfide, sulfur halide, and sulfur in the mole ratio of from 1:1 to 1:8, respectively, at a temperature ranging from below zero degree to about 175° C. and for a period of from 3 to 24 hours.

9. A reaction product obtained by reacting an isophorone bottoms fraction having at least twelve carbon atoms per molecule with ethylene diamine in the mole ratio of 2 to 6:1 to 3, respectively, at a temperature of from 80 to 180° C. until water formation ceases and treating the resulting reaction product with phosphorus sulfide in the mole ratio of from 1:1 to 1:4, respectively, and at a temperature of 125° to 175° C. and for a period of from 3 to 24 hours.

10. A reaction product obtained by reacting diisobutyl ketone with ethylene diamine in the mole ratio of 2 to 6:1 to 3, respectively, at a temperature of from 80 to 180° C. until water formation ceases and treating the resulting reaction product with phosphorus sulfide in the mole ratio of from 1:1 to 1:4, respectively, and at a temperature of 125° to 170° C. and for a period of from 3 to 24 hours.

11. A reaction product obtained by reacting an isophorone bottoms fraction having at least twelve carbon atoms per molecule with ethylene diamine in the mole ratio of 2 to 6:1 to 3, respectively, at a temperature of from 80 to 180° C. until water formation ceases and treating the resulting reaction product with sulfur in the mole ratio of from 1:1 to 1:4, respectively, and at a temperature of 125° to 175° C. and for a period of from 3 to 24 hours.

12. A reaction product obtained by reacting an isophorone bottoms fraction having at least twelve carbon atoms per molecule with ethylene diamine in the mole ratio of 2 to 6:1 to 3, respectively, at a temperature of from 80 to 180° C. until water formation ceases and treating the resulting reaction product with sulfur halide in the mole ratio of from 1:1 to 1:4, respectively, and at about room temperature and for a period of from 3 to 24 hours.

References Cited in the file of this patent
UNITED STATES PATENTS

| | | |
|---|---|---|
| 2,516,119 | Hersh | July 25, 1950 |
| 2,652,367 | Adelson | Sept. 15, 1953 |